(12) United States Patent
Yoshida

(10) Patent No.: US 10,972,667 B2
(45) Date of Patent: Apr. 6, 2021

(54) OPTICAL IMAGE STABILIZATION APPARATUS AND OPTICAL APPARATUS

(71) Applicant: CANON KABUSHIKI KAISHA, Tokyo (JP)

(72) Inventor: Shinsuke Yoshida, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/548,940

(22) Filed: Aug. 23, 2019

(65) Prior Publication Data

US 2020/0077025 A1    Mar. 5, 2020

(30) Foreign Application Priority Data

Sep. 4, 2018 (JP) .............................. JP2018-164975

(51) Int. Cl.
 *H04N 5/232* (2006.01)
 *G02B 27/64* (2006.01)
 *H04N 5/225* (2006.01)

(52) U.S. Cl.
 CPC ....... *H04N 5/23287* (2013.01); *G02B 27/646* (2013.01); *H04N 5/2253* (2013.01)

(58) Field of Classification Search
 CPC ............. H04N 5/23287; H04N 5/2253; G02B 27/646; G02B 7/021; H02K 41/02
 See application file for complete search history.

(56) References Cited

U.S. PATENT DOCUMENTS

| | | | | |
|---|---|---|---|---|
| 9,025,034 B2* | 5/2015 | Haraguchi | ......... | H04N 5/23283 348/208.11 |
| 2007/0279765 A1* | 12/2007 | Takahashi | .......... | H04N 5/23248 359/697 |
| 2008/0310054 A1* | 12/2008 | Fu | ......................... | G11B 25/043 360/264.7 |
| 2013/0063615 A1* | 3/2013 | Takeuchi | ........... | H04N 5/23258 348/208.5 |
| 2014/0379103 A1* | 12/2014 | Ishikawa | ............... | H04N 5/2253 700/56 |
| 2016/0006958 A1* | 1/2016 | Iwamatsu | ............ | H04N 5/2253 348/294 |
| 2016/0299349 A1* | 10/2016 | Cho | ...................... | H04N 5/2254 |
| 2019/0004328 A1* | 1/2019 | Lee | ...................... | H04N 5/2254 |
| 2020/0052621 A1* | 2/2020 | Yu | ........................ | H04N 5/2253 |

FOREIGN PATENT DOCUMENTS

JP     2015-169883 A     9/2015

* cited by examiner

*Primary Examiner* — Jason A Flohre
(74) *Attorney, Agent, or Firm* — Cowan, Liebowitz & Latman, P.C.

(57) ABSTRACT

An optical image stabilization apparatus includes an image stabilization element, a movable member configured to hold the image stabilization element, a support member configured to movably support the movable member, a coil held by one of the movable member and the support member, and a magnet held by the other of the movable member and the support member and opposite to the coil. The optical image stabilization apparatus drives the movable member by electrifying the coil to correct an image blur, and further includes a nonmagnetic conductor configured to cover a surface different from a magnet opposing surface of the coil that faces the magnet.

6 Claims, 5 Drawing Sheets

OPTICAL IMAGE STABILIZATION APPARATUS AND OPTICAL APPARATUS

BACKGROUND OF THE INVENTION

Field of the Invention

The present invention relates to an optical image stabilization apparatus mounted on an optical apparatus, such as an image pickup apparatus and an interchangeable lens.

Description of the Related Art

The above optical apparatus optically reduces (corrects) an image blur through an image stabilization operation that moves an image stabilization element, such as a lens, relative to an optical axis by the optical image stabilization apparatus as the optical apparatus vibrates, for example, due to a manual shake.

An image signal is generated from electric charges read out of an image sensor in the optical apparatus may contain noises that degrade the image quality. For example, when an actuator is driven to move the image stabilization element, the noises may be superimposed on the image signal due to the influence of a magnetic field from a coil included in the actuator. Japanese Patent Laid-Open No. ("JP") 2015-169883 discloses a method of reducing the noises in the image signal by turning off the current to an actuator when the electric charges are read out of the image sensor.

However, as in the method disclosed in JP 2015-169883, if the current to the actuator is turned off in reading the electric charges out of the image sensor, a holding force for the image stabilization element disappears and the position of the image stabilization element changes. When the image stabilization operation is resumed, it is necessary to restore the image stabilization element to its original position. In particular, a continuous image capturing speed is reduced by turning off the current and the position restoring operation of the image stabilization element in the continuous image capturing.

SUMMARY OF THE INVENTION

The present invention provides an optical image stabilization apparatus that makes an image signal less affected by noises when a coil is electrified.

An optical image stabilization apparatus according to one aspect of the present invention includes an image stabilization element, a movable member configured to hold the image stabilization element, a support member configured to movably support the movable member, a coil held by one of the movable member and the support member, and a magnet held by the other of the movable member and the support member and opposite to the coil. The optical image stabilization apparatus drives the movable member by electrifying the coil to correct an image blur, and further includes a nonmagnetic conductor configured to cover a surface different from a magnet opposing surface of the coil that faces the magnet.

An optical apparatus including the above optical image stabilization apparatus also constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

Figure 1:
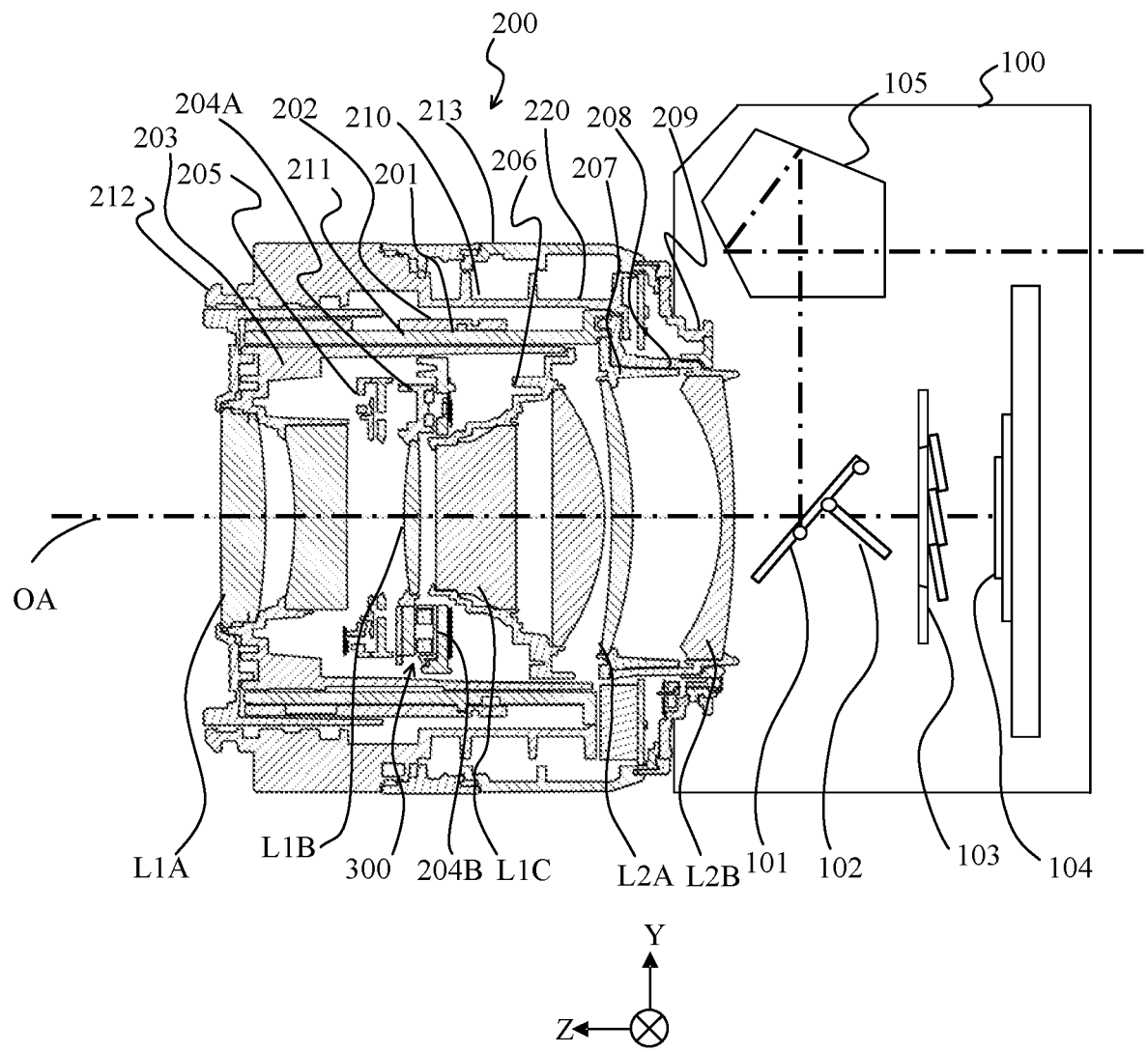
FIG. 1 is a sectional view showing a configuration of an interchangeable lens (in an infinity focus state) and a camera body according to this embodiment of the present invention.
Figure 2:
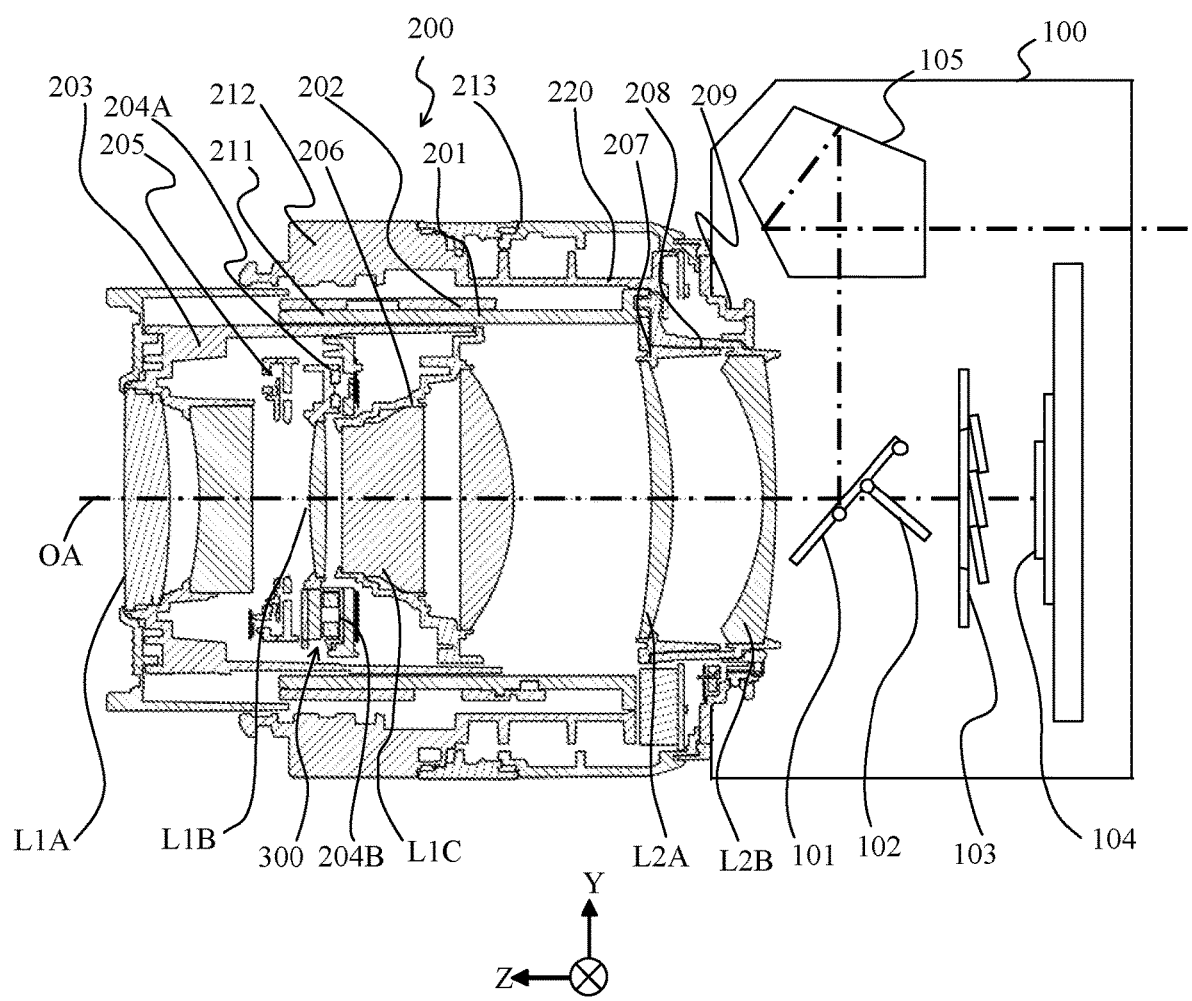
FIG. 2 is a sectional view showing the configuration of an interchangeable lens (in a short distance focus state) and the camera body according to this embodiment.

FIGS. 1 and 2 illustrate a configuration of an interchangeable lens 200 as an optical apparatus according to this embodiment of the present invention and a camera body 100 as an image pickup apparatus to which the interchangeable lens 200 is detachably attached. FIG. 1 illustrates the configuration when the image pickup distance of the interchangeable lens 200 is infinity, and FIG. 2 illustrates the configuration when the image pickup distance of the interchangeable lens 200 is a short distance (close or near).

In FIGS. 1 and 2, a direction in which an optical axis OA in the interchangeable lens 200 extends is set to a Z direction, and a direction parallel to a long side of the image pickup plane of the image sensor 104 is set to an X direction and a direction parallel to a short side of the image pickup plane is set to a Y direction among the two directions orthogonal to the optical axis OA.

In the camera body 100, a main mirror 101 reflects part of a light flux from the image pickup optical system in the interchangeable lens 200 and guides it to a pentaprism 105 and an unillustrated eyepiece. Thereby, the user can observe an object image through the eyepiece.

The light flux transmitted through the main mirror 101 is reflected by a sub mirror 102 disposed behind the main mirror 101 and guided to an unillustrated focus detection system. The focus detection system performs a focus detection by a phase difference detection method using the incident light flux.

A shutter unit 103 opens and closes shutter blades when the main mirror 101 and the sub mirror 102 are retreated from the optical path. Thereby, the time for the light flux to reach the image sensor 104 or the exposure time is controlled.

The image sensor 104 captures (photoelectrically converts) an object image formed by the image pickup optical system. An unillustrated signal processor in the camera body 100 generates an image signal by performing various types of image processing for a captured signal generated from the electric charges accumulated in the image sensor 104.

The camera body 100 according to this embodiment is a lens interchangeable single-lens reflex camera having the main mirror 101 and the sub mirror 102 and on which the interchangeable lens 200 is mounted. However, this embodiment is applicable to a nonreflex (mirrorless) camera body that does not have the main mirror 101 or the sub mirror 102 or a lens-integrated camera integrated with an image pickup optical system.

In the interchangeable lens 200, the image pickup optical system includes a first lens unit L1 and a second lens unit L2 in order from the object side (left side in the figure). The first lens unit L1 includes three lenses L1A, L1B, and L1C, and the second lens unit L2 includes two lenses L2A and L2B.

The lens L1A is held by a 1A barrel 203. The lens L1B is an image stabilization element, and held by a 1B movable barrel 204A. The 1B movable barrel 204A is movably held by a 1B fixed barrel 204B on the XY plane orthogonal to the optical axis direction. The 1B movable barrel 204A and the 1B fixed barrel 204B respectively constitute a movable member and a support member (fixed member) in the optical image stabilization unit (optical image stabilization apparatus) 300. The 1B fixed barrel 204B also holds an aperture stop unit 205 that adjusts a light amount.

The lens L1C is held by a 1C barrel 206. The 1B fixed barrel 204B and the 1C barrel 206 are fixed onto the 1A barrel 203. The first lens unit L1 (lenses L1A, L1B, L1C) is a movable lens unit, and moves in the optical axis direction integrally with the 1A barrel 203.

The lens L2A is held by a 2A barrel 207. The lens L2B is held by a 2B barrel 208. The 2A barrel 207 is fixed onto the 2B barrel 208. The 2B barrel 208 is fixed onto a guide barrel 201 with a screw or the like.

The lens L2A and the lens L2B have their outer diameters larger than that of the first lens unit L1 (lenses L1A, L1B, and L1C), and improve the light ray incident angle characteristic on the image sensor 104.

The second lens unit (lenses L2A and L2B) is a fixed lens unit which does not move in the optical axis direction and the direction orthogonal to it.

The interchangeable lens 200 includes a fixed barrel 212 and an exterior barrel 213. The fixed cylinder 212 holds the guide cylinder 201. A mount 209 is fixed onto the fixed cylinder 212 via an exterior cylinder 213. The interchangeable lens 200 is mechanically and electrically (communicatively) connected to the camera body 100 via the mount 209.

Next follows a description of focusing performed by moving the 1A barrel 203 in the optical axis direction. A cam cylinder 202 is rotatably engaged with the guide cylinder 201 around the optical axis OA. A cam follower 211 fixed onto the 1A barrel 203 is engaged with a rectilinear guide groove portion formed in the guide cylinder 201 so as to extend in the optical axis direction, and further engaged with a cam groove portion formed in the cam cylinder 202. Hence, as the cam barrel 202 rotates, the 1A barrel 203 (cam follower 211) is driven in the optical axis direction by the lift of the cam groove portion while being guided in the optical axis direction by the rectilinear guide groove portion.

The cam cylinder 202 includes a gear cam 210. A pinion is provided on the output shaft of a motor 220 as a focus actuator. The motor 220 is fixed onto an unillustrated gearbox. The gear box has an unillustrated reduction gear train. As the motor 220 rotates, the driving force (rotational force) from the pinion is transmitted to the gear cam 210 via the reduction gear train. When the gear cam 210 receives a rotational force, the cam barrel 202 rotates, and the 1A barrel 203 (cam follower 211) is driven in the optical axis direction as described above. In the camera body 100, an unillustrated microcomputer (camera microcomputer) that receives the focus detection result by the focus detection system described above calculates the driving amount of the 1A barrel 203 for bringing the image pickup optical system into focus. The camera microcomputer transmits a focus driving command including this driving amount to the unillustrated microcomputer (lens microcomputer) in the interchangeable lens 200. The lens microcomputer drives the motor 220 in response to the focus driving command. Thus, the autofocus is performed.

The motor 220 may be a stepping motor or a DC motor regardless of its type.

Figure 3A:
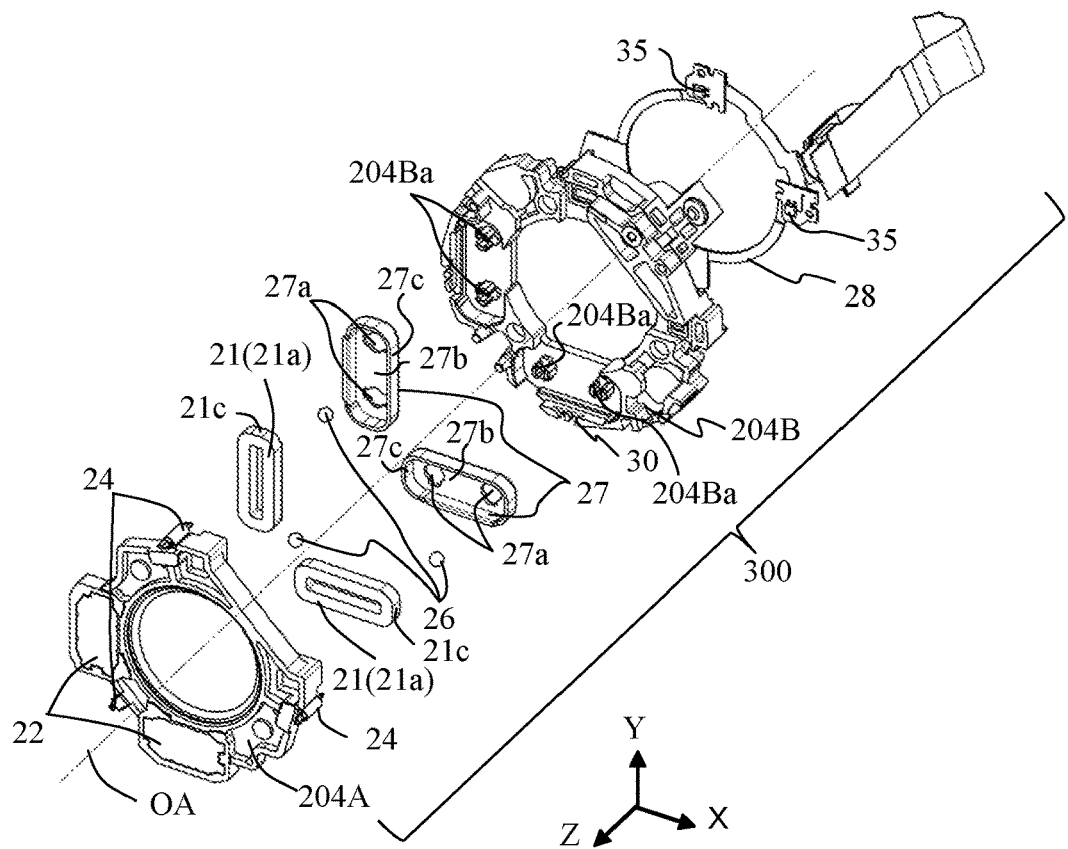
FIG. 3A is an exploded perspective view showing a configuration of the optical image stabilization apparatus according to this the embodiment viewed from the diagonally front side.
Figure 3B:
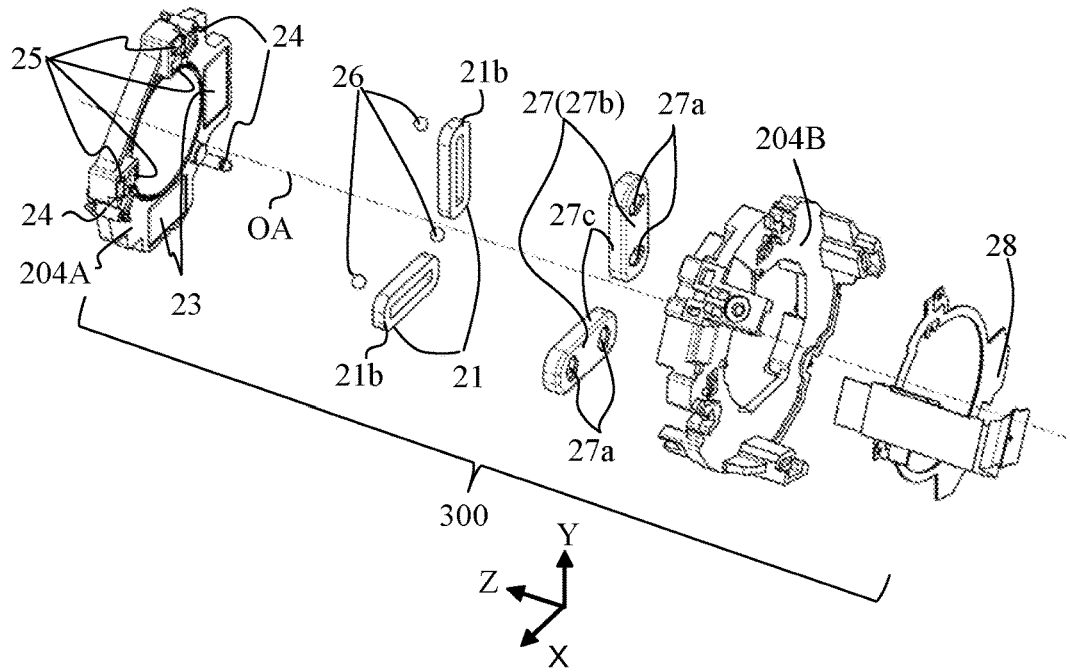
FIG. 3B is an exploded perspective view showing the configuration of the optical image stabilization apparatus according to the embodiment viewed from the diagonally rear side.

Referring now to FIGS. 3A and 3B, a description will be given of the optical image stabilization unit 300. FIGS. 3A and 3B illustrate the exploded optical image stabilization unit 300.

The optical image stabilization unit 300 reduces (corrects) an image blur by moving the lens L1B as an image stabilization element on the XY plane. As described above, the lens L1B is held by the 1B movable barrel 204A. The 1B movable barrel 204A is movably held on the XY plane by the 1B fixed barrel 204B.

A yoke 22 and a drive magnet 23 are disposed on the front side (object side) and the rear side (image side) of the 1B movable barrel 204A, and fixed onto the 1B movable barrel 204A while sandwiching the 1B movable barrel 204A by the mutual magnetic attraction. The yoke 22 and the drive magnet 23 are provided at two positions that are different in phase by 90° with each other around the optical axis OA.

Two coils 21 are adhered to the front end surface of a protrusion 204Ba which protrudes two each from the above two points on the front surface of the 1B fixed barrel 204B. Thereby, the coil 21 is positioned on the 1B fixed barrel 204B. One coil 21 is opposite to one drive magnet 23 in the optical axis direction, and the other coil 21 is opposite to the other drive magnet 23 in the optical axis direction.

A magnetic shield member 27 is disposed between the 1B fixed barrel 204B and the two coils 21 and adhered to the 1B fixed barrel 204B. The magnetic shield member 27 is a conductor made of a nonmagnetic material having a small electric resistance (or nonmagnetic conductor), such as copper or aluminum, and covers the rear surface and the outer circumferential side surface of the coil 21. The magnetic shield member 27 will be described in more detail later.

The coil 21 is electrically connected to the flexible substrate 28. Balls 26 are disposed at three positions around the optical axis OA between the 1B movable barrel 204A and the 1B fixed barrel 204B. The 1B movable barrel 204A and the 1B fixed barrel 204B are always attracted to each other in the optical axis direction by the spring forces of the three tension springs 24. The 1B movable barrel 204A is movably supported on the XY plane by the 1B fixed barrel 204B via the balls 26.

When the coil 21 is electrified, a Lorentz force is generated. Since the coil 21 is fixed to the 1B fixed barrel 204B, the 1B movable barrel 204A holding the drive magnet 23 is driven on the XY plane by Lorentz force (thrust). When one of the coils 21 is electrified, a thrust for driving the coil in the X direction is generated in the 1B movable barrel 204A. When the other coil 21 is electrified, a thrust is generated to drive the 1B movable barrel 204A in the Y direction. The 1B movable barrel 204A is driven in any directions on the XY plane by combining the thrusts in these two directions.

Position detection magnets 25 are adhered at two positions that are different in phase by 90° around the optical axis OA on the rear surface of the 1B movable barrel 204A. Hall elements are mounted at two locations of the flexible substrate 28 opposite to the position detection magnet 25 in the optical axis direction. The flexible substrate 28 is adhered to the rear surface of the 1B fixed barrel 204B. The Hall element converts the magnetic flux density of the position detection magnet 25 into an electrical signal. When the 1B group barrel 204A is driven on the XY plane, the Hall element detects a change in magnetic flux density of the position detection magnet 25 and outputs an electrical signal. This electrical signal can detect the position of the 1B group barrel 204A on the XY plane.

Figure 4:
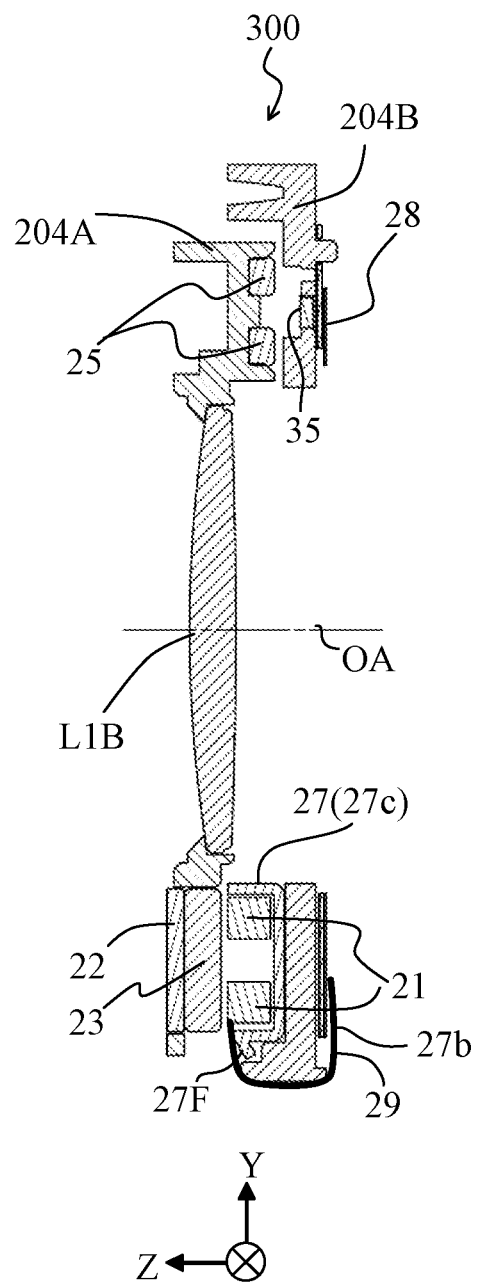
FIG. 4 is a sectional view of an optical image stabilization apparatus according to the embodiment.
Figure 5:
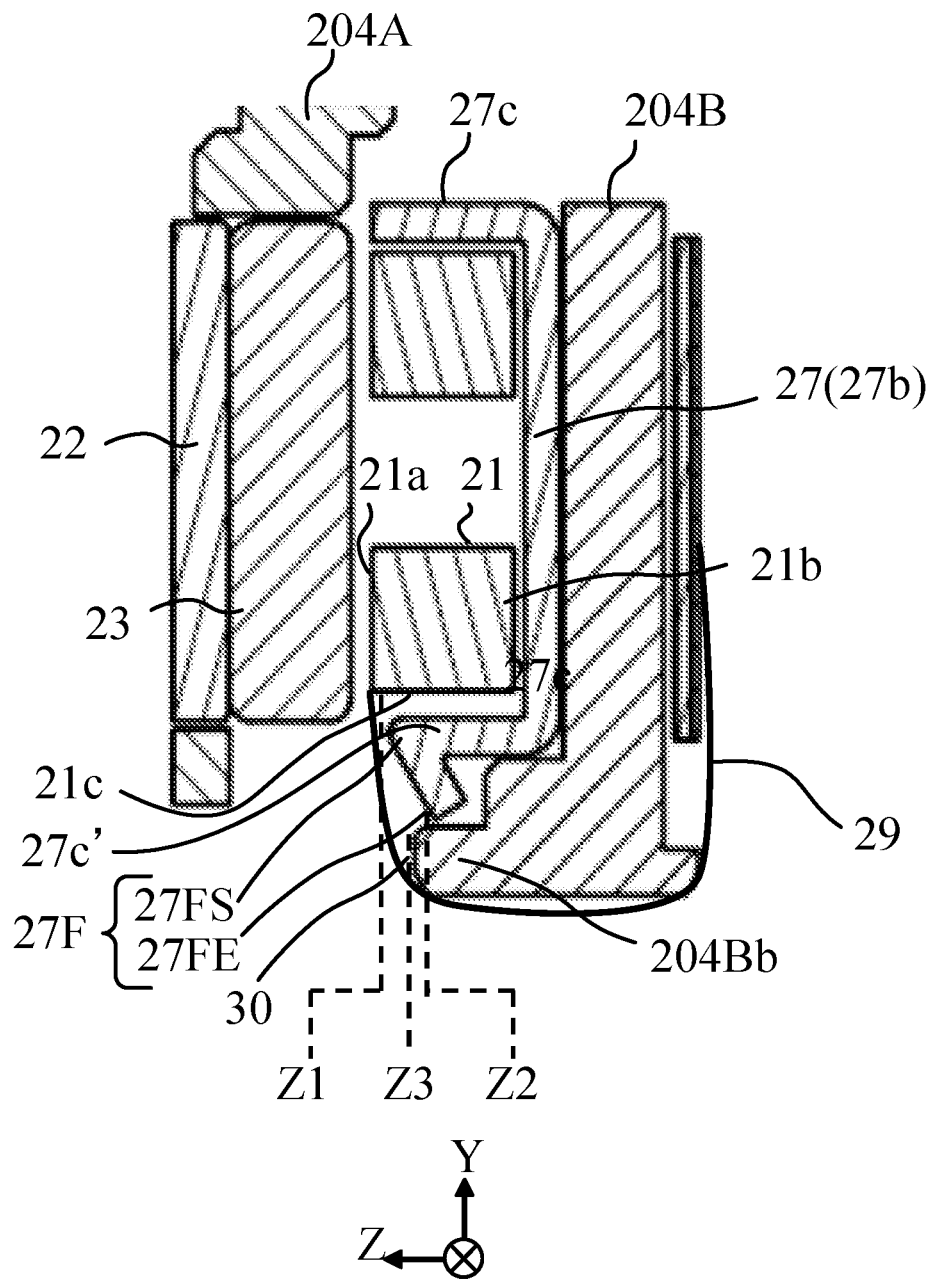
FIG. 5 is a partially enlarged view of FIG. 4.

Next follows a description of a relationship between the coil 21 and the magnetic noises. FIG. 4 illustrates the YZ section of the optical image stabilization unit 300, and FIG. 5 illustrates the enlarged periphery of the coil 21 in FIG. 4.

As described above, the coil 21 and the drive magnet 23 are disposed at mutually opposing positions. Hence, when the coil 21 is electrified, a Lorentz force is generated in the drive magnet 23, and the 1B group barrel 204A is driven on the XY plane. Then, a magnetic field is generated from the coil 21. When this magnetic field reaches the image sensor 104, the image signal is affected by magnetic noises due to the fluctuation of the magnetic field (magnetic flux density). More specifically, a magnetic field that changes at a high frequency penetrates through the signal line for reading out the electric charges from the image sensor 104. This configuration generates the magnetism due to the electromagnetic induction in the signal line, which appears as the noises. As a result, the image quality of the image signal (captured image) is degraded.

It is necessary to reduce the magnetic field reaching the image sensor 104 from the coil 21. Accordingly, this embodiment covers with the magnetic shield member 27, the rear surface 21b and the outer circumferential side surface 21c as two surfaces of the coils 21 on the side of the image sensor 104 (image pickup plane side) of the surface (referred to as a magnet opposing surface hereinafter) 21a of the coil 21 opposite to the drive magnet 23. In other words, the surface of the coil 21 different from the magnet opposing surface 21a is covered with the magnetic shield member 27.

In the magnetic shield member 27, a portion covering the rear surface 21b opposite to the magnet opposing surface 21a of the coil 21 or a portion adhered to the front surface of the 1B fixed barrel 204B will be referred to as a bottom surface portion 27b in the following description. In the magnetic shield member 27, a portion extending from the bottom surface portion 27b along the outer circumferential side surface 21c of the coil 21 and covering the outer circumferential side surface 21c will be referred to as a side surface portion 27c in the following description.

As described above, the magnetic shield member 27 is made of a nonmagnetic conductor. When the magnetic field generated from the coil 21 attempts to pass through the magnetic shield 27, the magnetic flux density changes in the magnetic shield member 27, and an eddy current is generated by electromagnetic induction. As a result, the magnetic flux passing through the magnetic shield member 27 reduces. In other words, the magnetic field reaching the image sensor 104 reduces, and magnetic noises appearing in the image signal can be reduced.

The coil 21 is configured by winding a copper wire around a core, and a magnetic field is generated from any positions of the coil 21. Thus, the configuration in which the whole of the coil 21 is covered with the magnetic shield member 27 can most effectively restrain the magnetic field from reaching the image sensor 104. When the magnetic shield member 27 is disposed between the coil 21 and the drive magnet 23, the distance between the coil 21 and the drive magnet 23 increases in the optical axis direction, and the optical image stabilization unit 300 increases in size in the optical axis direction. The distance between the coil 21 and the drive magnet 23 is increased, and the thrust reduces. Thus, this embodiment does not cover the magnet opposing surface 21a of the coil 21 with the magnetic shield member 27.

A magnetic field is generated from the coil 21 in a variety of directions. Thus, where the magnetic shielding is performed at a location apart from the coil 21, a large magnetic shield member is required. Thus, this embodiment disposes the magnetic shield member 27 at a position adjacent to the coil 21 (between the coil 21 and the 1B fixed barrel 204B).

As illustrated in FIGS. 3A and 3B, two openings 27a are formed in the bottom surface portion 27b of the magnetic shield member 27. The openings 27a are formed to penetrate through the above protrusion 204Ba formed in the 1B fixed barrel 204B.

The interchangeable lens 200 includes a variety of components, and a conductor may be disposed around or near the coil 21. In this case, the direction of the magnetic field from the coil 21 may change due to the presence of the conductor. In this case, the direction covered by the magnetic shield member 27 when viewed from the coil 21 may be appropriately selected.

As illustrated in FIGS. 4 and 5, from the winding start position and the winding end position of the copper wire in the coil 21, lead wires 29 are drawn out for the electrical connection with the flexible substrate 28. As described above, when the whole of the coil 21 is covered with the magnetic shield member 27 including the surface opposite to the drive magnet 23, it is necessary to pass the lead wire 29 between the coil 21 and the drive magnet 23. However, in order to avoid a contact between the lead wire 29 and the drive magnet 23, a predetermined clearance must be secured in the optical axis direction between them, so the optical image stabilization unit 300 becomes larger in the same direction. When the clearance between the coil 21 and the drive magnet 23 increases, the thrust decreases.

Thus, this embodiment makes uneven, as illustrated in FIG. 5, the height of the side surface portion 27c of the magnetic shield member 27 (hereinafter referred to as Z height) in the optical axis direction from the bottom surface portion 27b. More specifically, as illustrated in FIG. 5, the Z height of the side portion 27c on the side (inner side) closer to the optical axis OA of the magnetic shield member 27 is set to be the same as the magnet opposing surface 21a of the coil 21. On the other hand, the Z height Z1 of the side portion 27c' of the magnetic shield member 27 on the side (outside) far from the optical axis OA is set lower than the inner side surface portion 27c and the magnet opposing surface 21a of the coil 21.

When viewed from the Y direction, part of the coil 21 is exposed from the outer side surface portion 27c' of the magnetic shield member 27. Thereby, the lead wire 29 of the coil 21 can be drawn out of the magnetic shield member 27 while it is prevented from extending beyond the magnet opposing surface 21a of the coil 21 toward the drive magnet 23. In other words, the lead wire 29 can be connected to the flexible substrate 28 without widening the clearance between the coil 21 and the drive magnet 23.

This embodiment makes lower the Z height of the outer side surface portion 27c' of the magnetic shield member 27 than the inner side surface portion 27c and the magnet opposing surface 21a of the coil 21. However, when the lead wires are drawn in different directions from the winding start and winding end of the copper wire in the coil, both the Z heights of the inner and outer side surface portions may be set lower than the magnet opposing surface of the coil. Alternatively, even if the Z heights of the outer side and the inner side surface portions of the magnetic shield member may be made the same as the magnet opposing surface of the coil, a notch portion may be formed to draw the lead wires at one or more locations of the magnetic shield member. In other words, the Z height of at least part of the side surface portion may be made lower than the magnet opposing surface of the coil.

When the magnetic shield member 27 is manufactured by drawing from a plate of a nonmagnetic conductor, the edge of the side surface portion of the magnetic shield member 27 is barred on the drive magnet 23 side. Even manufacturing by bending leaves burrs due to punching of the plate of the nonmagnetic conductor. Thereby, due to the burrs at the location where the lead wire 29 is drawn out, the lead wire 29 contacts the burrs, which may cause the coating to break or peel off.

Accordingly, this embodiment forms a bent portion 27F on the outer side surface portion 27c' whose height in the Z direction is reduced in order to draw out the lead wire 29 in the magnetic shield member 27. A root portion 27FS of the bent portion 27F which contacts or closely opposes to the lead wire 29 is formed as a smooth curved surface portion. An edge portion 27FE in the bent portion 27F which extends outside of the root portion 27FS and is likely to possess burrs is located (at a position apart from the lead wire 29) behind the root portion 27FS and the front end surface 30 of a sidewall portion 204Bb of the 1B fixed barrel 204B. The front end surface 30 of the sidewall portion 204Bb of the 1B fixed barrel 204B also contacts or closely opposes to the lead wire 29. Thereby, the lead wire 29 is prevented from contacting the burrs and from causing the disconnection or peel-off.

As illustrated in FIGS. 4 and 5, the coils 21 are disposed on the front side of the 1B fixed barrel 204B, and the flexible substrate 28 is disposed on the rear side of the 1B fixed barrel 204B. Thus, it is necessary to draw the lead wire 29 of the coil 21 to the flexible substrate 28 so that it goes around the outside of the sidewall portion 204Bb of the 1B fixed barrel 204B. This embodiment makes higher the Z height Z3 of the front end surface 30 of the sidewall portion 204Bb of the 1B fixed barrel 204B than the Z height Z2 of the edge portion 27FE of the bent portion 27F in the magnetic shield member 27 where burrs may exist. The Z height Z3 of the front end surface 30 is set smaller than the Z height Z1 of the root portion 27FS of the bent portion 27F in the magnetic shield member 27.

This set Z height can prevent the lead wire 29 from contacting the edge portion 27FE in the magnetic shield member 27, allows the lead wire 29 to contact the root portion 27FS of the bent portion 27F and the front end surface 30 of the 1B fixed barrel 204B, and enables the leads 29 to go around up to the flexible substrate 28. Since the sidewall portion 204Bb of the 1B fixed barrel 204B is formed of a resin, the disconnection or peel-off of the film is unlikely even if the lead wire 29 contacts it.

This embodiment sets the Z heights Z1, Z3 and Z2 described above so that they become lower in this order. Since this embodiment prevents the lead wire 29 from contacting the edge portion 27 of the bent portion 27F in the magnetic shield member 27, the Z heights Z3, Z1, and Z2 may be set to be lower in this order.

This embodiment can provide the interchangeable lens 200 that is less likely to transmit the influence of the magnetic noises to the image signal when the coils 21 in the optical image stabilization unit 300 are electrified, by using the magnetic shield member 27 covering the coils 21. This embodiment can provide the interchangeable lens 200 that can suppress the upsizing of the optical image stabilization unit 300 when the magnetic shield member 27 is provided, and prevent the lead wires 29 drawn from the coils 21 from being disconnected or the coating from being peeled off.

The above embodiment describes a moving magnet type optical image stabilization apparatus that holds the coil by the support member and the magnet by the movable member. However, the embodiment of the present invention is applicable to a moving coil type optical image stabilization apparatus in which the magnet is held by the support member and the coil is held by the movable member. In this case, the magnetic shield member (nonmagnetic conductor) may be disposed between the coil and the movable member (at a position adjacent to the coil).

The above embodiment describes the interchangeable lens having the optical image stabilization apparatus, but is applicable to a lens integrated image pickup apparatus as an optical apparatus having the optical image stabilization apparatus. The above embodiment describes the optical image stabilization apparatus that moves on the XY plane the lens used as the image stabilization element, but the embodiment of the present invention is applicable to the optical image stabilization apparatus that moves on the XY plane the image sensor used as the image stabilization element.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-164975, filed on Sep. 4, 2018, which is hereby incorporated by reference herein in its entirety.

What is claimed is:

1. An optical image stabilization apparatus comprising:
an image stabilization element;
a movable member configured to hold the image stabilization element;
a support member configured to movably support the movable member;
a coil held by one of the movable member and the support member; and
a magnet held by the other of the movable member and the support member and opposite to the coil,
wherein the optical image stabilization apparatus drives the movable member by electrifying the coil to correct an image blur,
wherein the optical image stabilization apparatus further comprises a nonmagnetic conductor configured to cover a surface different from a magnet opposing surface of the coil that faces the magnet, and
wherein the nonmagnetic conductor is disposed between the coil and the one of the movable member and the support member.

2. An optical image stabilization apparatus comprising:
an image stabilization element;
a movable member configured to hold the image stabilization element;
a support member configured to movably support the movable member;
a coil held by one of the movable member and the support member; and
a magnet held by the other of the movable member and the support member and opposite to the coil,
wherein the optical image stabilization apparatus drives the movable member by electrifying the coil to correct an image blur, wherein the optical image stabilization apparatus further comprises a nonmagnetic conductor configured to cover a surface different from a magnet opposing surface of the coil that faces the magnet, wherein the nonmagnetic conductor has a bottom surface portion configured to cover a surface opposite to the magnet opposing surface of the coil, and a side surface portion extending from the bottom surface portion along an outer circumferential side surface of the coil to cover the outer circumferential side surface, wherein a height from the bottom surface portion of at least part of the side surface portion of the nonmagnetic conductor is lower than the magnet opposing surface, and wherein a lead wire is drawn from a portion of the coil exposed from the at least one portion of the side surface portion.

3. The optical image stabilization apparatus according to claim 2, wherein a bent portion is formed on at least part of the side surface portion of the nonmagnetic conductor, and wherein the lead wire contacts or opposes to a curved surface portion of the bent portion.

4. The optical image stabilization apparatus according to claim 3, wherein an edge portion of the bent portion extending from the curved portion is located farther from the lead wire than the curved surface portion.

5. The optical image stabilization apparatus according to claim 2, wherein a height from the bottom surface portion of a portion of the support member which the lead wire contacts or opposes to is lower than that of the curved surface portion.

6. An optical apparatus comprising:
an optical image stabilization apparatus,
wherein the optical image stabilization includes:
an image stabilization element;
a movable member configured to hold the image stabilization element;
a support member configured to movably support the movable member;
a coil held by one of the movable member and the support member; and
a magnet held by the other of the movable member and the support member and opposite to the coil,
wherein the optical image stabilization apparatus drives the movable member by electrifying the coil to correct an image blur,
wherein the optical image stabilization apparatus further comprises a nonmagnetic conductor configured to cover a surface different from a magnet opposing surface of the coil that faces the magnet, and
wherein the nonmagnetic conductor covers a surface of the coil on an image pickup plane side.

* * * * *